United States Patent
Katoh et al.

(10) Patent No.: US 10,099,314 B2
(45) Date of Patent: Oct. 16, 2018

(54) TOOL HOLDER AND MACHINE TOOL

(71) Applicant: Toshiba Kikai Kabushiki Kaisha, Tokyo (JP)

(72) Inventors: Kouichi Katoh, Gotemba (JP); Masami Aihara, Gotemba (JP); Atsushi Tada, Gotemba (JP); Makoto Sawazaki, Gotemba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/455,916

(22) Filed: Mar. 10, 2017

(65) Prior Publication Data

US 2017/0266755 A1    Sep. 21, 2017

(30) Foreign Application Priority Data

Mar. 18, 2016 (JP) .................................. 2016-055943
Dec. 1, 2016 (JP) .................................. 2016-233977

(51) Int. Cl.
*B23K 20/12* (2006.01)
*F16C 19/30* (2006.01)
*B23Q 5/04* (2006.01)
*F16C 19/54* (2006.01)
*F16C 35/06* (2006.01)

(52) U.S. Cl.
CPC .......... *B23K 20/1245* (2013.01); *B23Q 5/043* (2013.01); *F16C 19/30* (2013.01); *F16C 19/548* (2013.01); *F16C 35/061* (2013.01); *B23Q 2230/002* (2013.01); *F16C 2322/39* (2013.01)

(58) Field of Classification Search
CPC ............ B23K 20/1255; B23K 20/1235; B23K 20/125; B23K 20/122; B23K 20/126; B23K 37/06
USPC ........................................ 228/2.1, 112.1, 2.3
See application file for complete search history.

(56) References Cited

U.S. PATENT DOCUMENTS

2006/0032887 A1*   2/2006   Haynie ................ B23K 20/125
                                                                 228/2.1

FOREIGN PATENT DOCUMENTS

| JP | 2005-177844 | 7/2005 |
| JP | 2012-000698 | 1/2012 |
| JP | 55-48530 | 7/2014 |
| JP | 5548530 | 7/2014 |

OTHER PUBLICATIONS

Computer english translation of JP20012-000698.*

(Continued)

*Primary Examiner* — Erin B Saad
(74) *Attorney, Agent, or Firm* — DLA Piper LLP US

(57) ABSTRACT

A tool holder of a machine tool, in which the machine tool includes a spindle head and a spindle supported by the spindle head, includes: a shank portion attached to the spindle; a rotary portion integrally provided to the shank portion and to which a welding tool (processing tool) used for friction stir welding is attachable; a bearing mechanism (bearing) supporting the rotary portion so that the rotary portion is rotatable; and a bearing holder holding the bearing mechanism, in which the bearing holder is disposed facing the spindle head and is capable of transmitting a load applied to the bearing mechanism to the spindle head.

3 Claims, 3 Drawing Sheets

(56) References Cited

OTHER PUBLICATIONS

English Language Abstract and Translation of JP 2005-177844 published Jul. 7, 2005.
English Language Abstract and Translation of JP 2012-000698 published Jan. 5, 2012.
English Language Translation (Machine) of JP 55-48530 published Jul. 16, 2014.

* cited by examiner

TOOL HOLDER AND MACHINE TOOL

The entire disclosures of Japanese Patent Application No. 2016-055943 filed Mar. 18, 2016 and Japanese Patent Application No. 2016-233977 filed Dec. 1, 2016 are expressly incorporated by reference herein.

TECHNICAL FIELD

The present invention relates to a tool holder and a machine tool.

BACKGROUND ART

Recently, friction stir welding has been used as a welding method of materials (Patent Literature 1: JP-A-2005-177844).

In the friction stir welding, a rotating welding tool is pressed onto to-be-joined objects to fluidize the to-be-joined objects with friction heat, resulting in jointing of the objects.

In the friction stir welding, the welding tool is attached to a spindle of a friction stir welding machine and is configured to be driven to be rotated around a rotary axis that is in a direction intersecting with surfaces of the to-be-joined objects. While being kept rotated, the welding tool is moved along a to-be-joined portion of the surfaces of the to-be-joined objects.

The friction stir welding machine is often a machine dedicated for applying pressure on the objects to generate a friction heat by axially moving the welding tool or a workpiece while rotating the welding tool with a high torque. On the other hand, a general-purpose machine tool can replace the friction stir welding machine as far as the general-purpose machine tool is used for rotating the spindle and moving the tool or the workpiece.

The welding tool is exemplified by a welding tool including a cylindrical holder and a conical pin formed on a lower end surface of the holder and extending downward and coaxially with the holder. A stepped shoulder is formed around the pin.

In an operation of the friction stir welding, the pin is pressed into the to-be-joined objects and the shoulder is kept facing the surfaces of the to-be-joined objects.

As described above, when the friction stir welding is performed with the general-purpose machine tool attached with the welding tool, since the welding tool is pressed onto the to-be-joined objects while being kept rotated, a strong force is required for pressing the welding tool into the to-be-joined objects. Accordingly, a strong thrust force is applied in a rotary axial direction on the spindle attached with the welding tool and the spindle head. Such a strong thrust force is usually unexpected in the general-purpose machine tool configured to cut with a cutting blade. Accordingly, in the machine tool including a spindle bearing (main bearing) whose thrust strength is not sufficient, the spindle bearing may possibly be damaged.

Such an excessive load applied on the spindle bearing of the machine tool is not specific to the friction stir welding, but may possibly occur in cutting among other machining methods. Accordingly, it has been desired to provide a tool holder and a machine tool which are capable of reducing the load applied on the spindle bearing.

SUMMARY OF THE INVENTION

An object of the invention is to provide a tool holder and a machine tool which are capable of reducing a load applied on a spindle bearing.

According to an aspect of the invention, a tool holder of a machine tool, the machine tool including a spindle head and a spindle supported by the spindle head, the tool holder includes: a shank portion attached to the spindle; a rotary portion integrally provided to the shank portion and to which a processing tool is attachable; a bearing supporting the rotary portion so that the rotary portion is rotatable; and a bearing holder holding the bearing, in which the bearing holder is disposed facing the spindle head and is capable of transmitting a load applied to the bearing to the spindle head.

In the above aspect of the invention, the shank portion attached to the spindle is driven by the spindle, so that the rotary portion and the processing tool attached to the rotary portion are rotated. The rotating processing tool is brought into contact with the workpiece (a machining target), so that the workpiece can be machined.

Herein, a reaction force of the workpiece causes a strong load on the rotary portion attached with the processing tool, however, the load can be transmitted through the bearing to the bearing holder and then to the spindle head to be released therefrom. Accordingly, the spindle can be free from receiving the strong load, so that a spindle bearing can be kept safe.

In the tool holder with the above arrangement, it is desirable that the bearing holder includes a contact member on a surface facing the spindle head, the contact member being contactable with an end surface of the spindle head, and the contact member includes a plurality of contact members that are circumferentially disposed around the spindle.

With this arrangement, the load can be transmitted from the bearing to the spindle head through the contact member.

Further, since the contact members are a plurality of divided members, a contact area of the contact members with the spindle head can be made smaller than a contact area of a contact member continuously extending along the entire circumference of the bearing holder, so that a high heat generated by the processing tool can be suppressed from being conducted to the spindle head.

In the tool holder with the above arrangement, it is desirable that the contact members are circumferentially equidistant from each other around the spindle.

With this arrangement, since the contact members are circumferentially equidistant from each other, the thrust force applied to the spindle head can be circumferentially balanced.

In the tool holder with the above arrangement, it is desirable that the rotary portion includes a refrigerant path therein.

With this arrangement, the heat conducted from the processing tool to the rotary portion can be cooled with the refrigerant flowing through the refrigerant path, so that the heat can be suppressed from being conducted to the bearing and the spindle head. Further, the tool also can be cooled after the welding operation is finished, thereby shortening a time before restarting the welding operation.

In the tool holder with the above arrangement, it is desirable that the processing tool is a welding tool used for friction stir welding, and the bearing include a thrust bearing.

With this arrangement, the friction stir welding can be performed by pressing the rotating welding tool onto the to-be-joined objects (the machining target).

Here, the reaction force of the to-be-joined objects causes a strong thrust force on the welding tool and the rotary portion, however, this thrust force can be transmitted through the thrust bearing to the bearing holder and then to the spindle head to be released therefrom. Accordingly, the spindle can be free from receiving the strong thrust force, so that the spindle bearing can be kept safe.

According to an aspect of the invention, a machine tool includes: the tool holder in the above aspect of the invention; and a stopper formed between the spindle head and the bearing holder.

According to the machine tool in the above aspect of the invention, the same effects as those of the tool holder in the above aspect of the invention can be obtained.

According to the above aspects of the invention, a tool holder and a machine tool which are capable of reducing a load applied on a spindle bearing can be provided.

BRIEF DESCRIPTION OF DRAWING(S)

DESCRIPTION OF EMBODIMENT(S)

Exemplary embodiment(s) of the invention will be described below with reference to the attached drawings.

Figure 1:
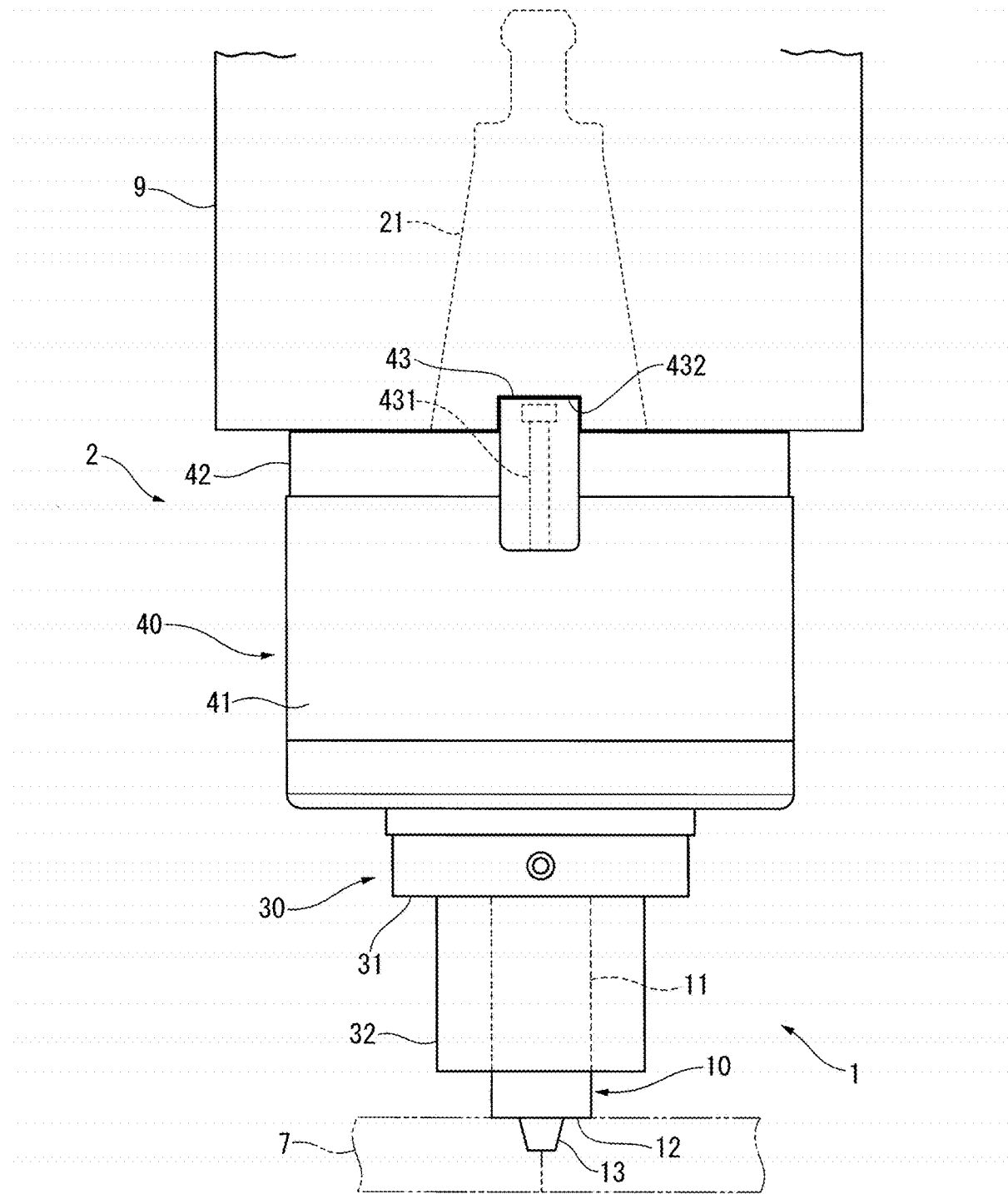
FIG. 1 is a side view showing an exemplary embodiment of the invention.
Figure 2:
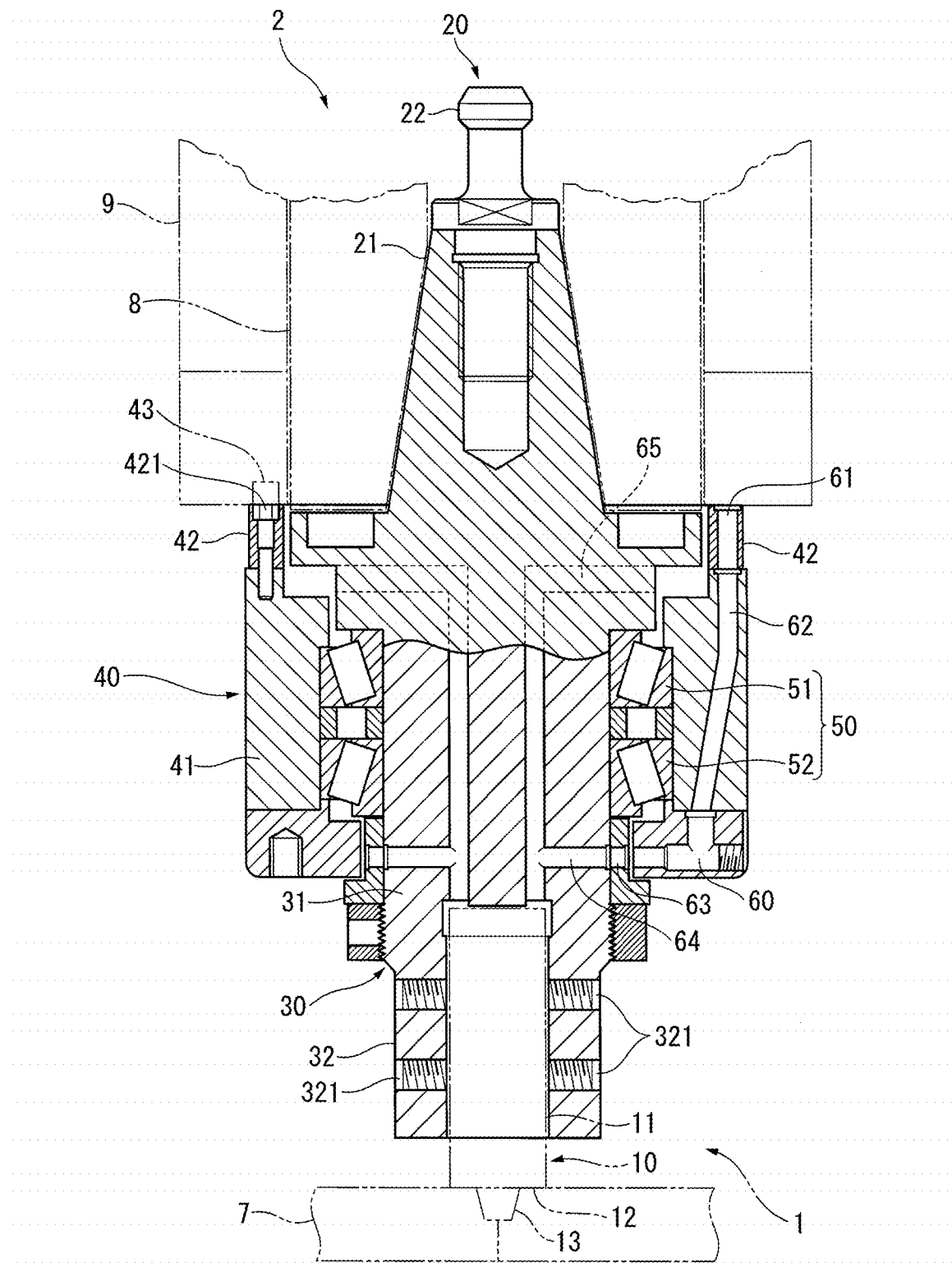
FIG. 2 is a cross-sectional view showing an internal structure in the exemplary embodiment of the invention.

As shown in FIGS. 1 and 2, a friction stir welding tool 1 in an exemplary embodiment of the invention is attached to a spindle 8 supported by a spindle head 9 of a machine tool and is configured to perform friction stir welding against to-be-joined objects 7.

As the machine tool in the exemplary embodiment, various types of machine tools capable of rotating the spindle 8 and moving the spindle 8 with respect to a workpiece (i.e., the to-be-joined objects 7 in the exemplary embodiment, or a to-be-cut target when the machine tool is used as a machine tool) are usable. In the exemplary embodiment, the spindle head 9 and the friction stir welding tool 1 are movable to a desired position with respect to the to-be-joined objects 7.

In the machine tool, the spindle 8 is rotatably supported by the spindle head 9 and is configured to be rotated by being driven by a motor (not shown) disposed to the spindle head 9.

The friction stir welding tool 1 includes: a welding tool 10 used for friction stir welding; and a shank 20 attachable to the spindle 8. Further, the friction stir welding tool 1 includes: a rotary portion 30 connecting the welding tool 10 to the shank 20; a bearing holder 40 connected to the spindle head 9; and a bearing mechanism 50 provided inside the bearing holder 40 and supporting the rotary portion 30 so that the rotary portion 30 is rotatable.

Herein, the welding tool 10 defines a processing tool of the invention, the bearing holder 40 defines a bearing holder of the invention, and the bearing mechanism 50 defines a bearing of the invention.

The shank 20, the rotary portion 30, the bearing mechanism 50 (the bearing), and the bearing holder 40 (the bearing holder) provide the tool holder 2 of the invention.

In the exemplary embodiment, the welding tool 10 used for friction stir welding is attached to the tool holder 2, thereby providing the friction stir welding tool 1.

The welding tool 10, which is a tool used for friction stir welding, includes a tool body 11, and a shoulder 12 and a pin 13 that are provided to a tip end of the tool body 11.

When the welding tool 10 in a rotating condition is pressed onto the to-be-joined objects 7, the pin 13 at the tip end of the welding tool 10 is pressed into the to-be-joined objects 7 while heating to stir the material of the to-be-joined objects 7, so that a seam of the to-be-joined objects 7 can be softened to be joined.

The shank 20, which is a 7/24 tapered shank (BT type) for automatic tool replacement determined in accordance with JIS B6339-2:2011, is attachable to the spindle 8 in accordance with JIS B6340-2:2011 corresponding to the above standard.

The shank 20 has a tapered cone 21 and a pull stud 22 and is configured to be pulled into an inside of a tapered hole of the spindle 8 using the pull stud 22. With the tapered cone 21 in tight contact with an inner surface of the tapered hole, the shank 20 is held by the spindle 8, so that a rotary force of the spindle 8 is transmittable to the shank 20.

The rotary portion 30 has a cylindrical shaft 31. A side of the shaft 31 near the spindle 8 is continuous to the shank 20.

A side of the shaft 31 near the welding tool 10 is in a form of a chuck 32 for fixing the welding tool 10.

The chuck 32 is formed in a cylinder capable of coaxially housing the tool body 11 of the welding tool 10. A plurality of bolts 321 are provided on the cylinder, extending toward the center of the cylinder.

The tool body 11 is attached to the chuck 32 by being pressed on the bottom of the cylindrical chuck 32, whereby the tool body 11 and the chuck 32 are ready for receiving a force in a thrust direction. Further, the tool body 11 is fastened with the bolts 321, thereby stopping the rotation of the welding tool 10 with respect to the shaft 31.

The bearing holder 40 has a cylindrical case 41.

Figure 3:
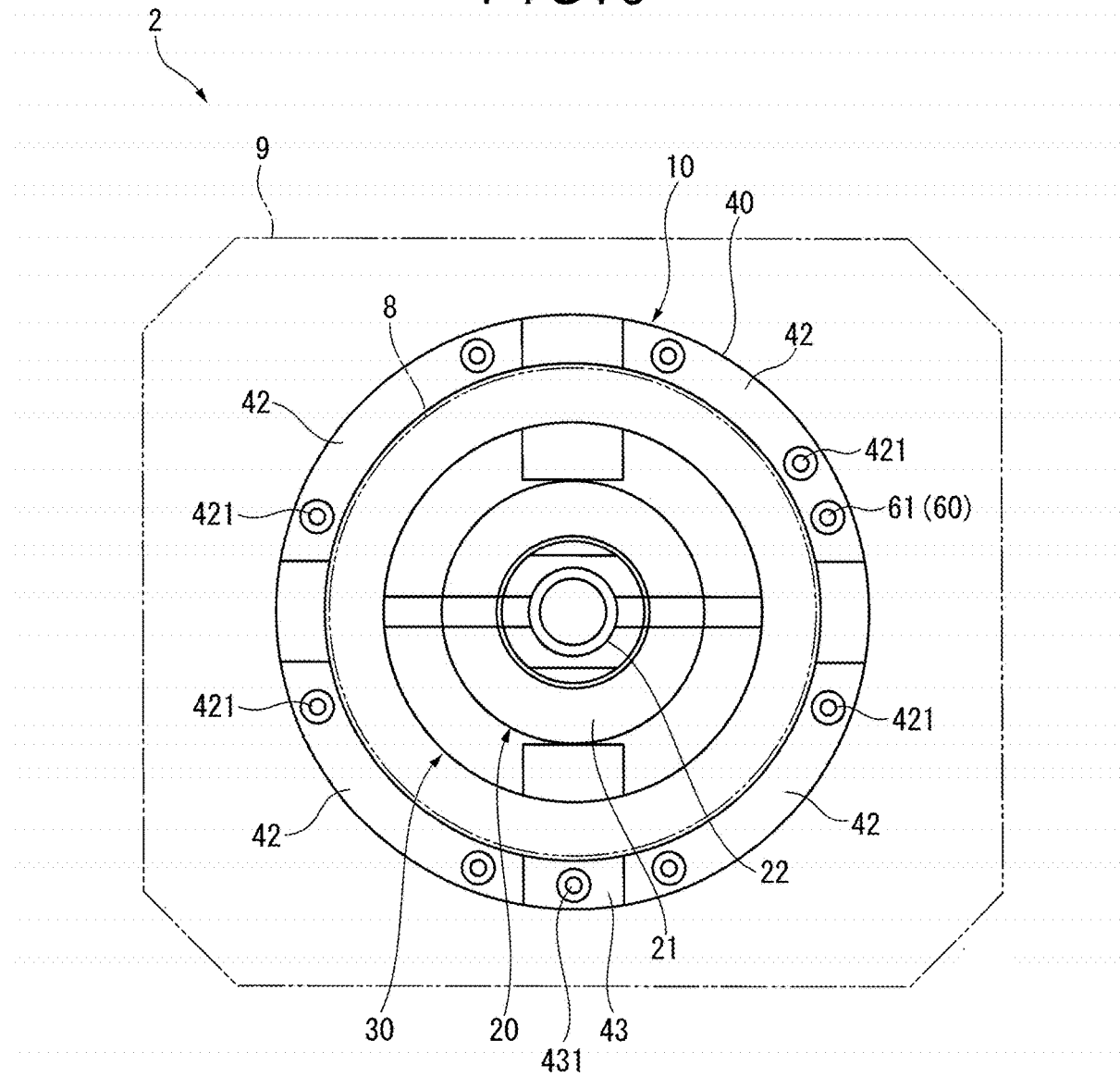
FIG. 3 is a plan view showing a shank portion in the exemplary embodiment of the invention.

As shown in FIG. 3, contact members 42 are fixed with bolts 421 along an outer peripheral edge of the case 41 on an end surface of the case 41 near the spindle 8. Moreover, a positioning member 43 is fixed with a bolt 431 to the case 41 in a part of spaces between the contact members 42.

Each of the contact members 42 is an arc-shaped member. Four contact members 42 are equidistant from each other.

In a condition where the friction stir welding tool 1 is attached to the spindle 8, the contact members 42 can be in contact with the innermost portion of the end surface of the spindle head 9. In this condition, the contact members 42 are free from interference with the spindle 8.

The positioning member 43 is interposed between a pair of the contact members 42 and projects beyond the contact members 42.

A concave portion 432 capable of housing the positioning member 43 is formed in the spindle head 9 (see FIG. 1). In the condition where the friction stir welding tool 1 is attached to the spindle 8, the positioning member 43 is fitted in the concave portion 432, whereby rotation of the bearing holder 40 is stopped at a predetermined angular position with respect to the spindle head 9.

The bearing mechanism 50 includes a pair of angular roller bearings 51 and 52 provided back-to-back. Each of the angular roller bearings 51 and 52 includes many rollers held so that rotary axes of the respective rollers diagonally intersect with a rotary axis of the rotary portion 30. The angular roller bearings 51 and 52 simultaneously have a function as a thrust bearing to receive a load along the central axis and a function as a radial bearing to receive a load in a direction intersecting with the central axis.

It should be noted that, although the bearing mechanism 50 is in a form of the angular roller bearings 51 and 52 in the exemplary embodiment, the bearing mechanism 50 may be replaced by an angular ball bearing. However, the roller bearing can withstand a higher load than the angular ball bearing. Alternatively, the angular bearing may be replaced by a combination of a thrust bearing and a radial bearing.

However, the angular bearing occupies less space than the combination of the thrust bearing and the radial bearing. Moreover, it is non-essential to make the angular bearing in a pair like the angular roller bearings 51 and 52. The angular bearing only needs to have the function of the thrust bearing capable of bearing the load applied at least in an axial direction from the welding tool 10 toward the spindle 8 at the bearing holder through the rotary portion.

As shown in FIG. 2, a refrigerant path 60 circulating the bearing holder 40 and the rotary portion 30 is formed in the friction stir welding tool 1 in the exemplary embodiment.

The refrigerant path 60 includes: an intake 61 formed in a part of the contact members 42; a bearing holder path 62 and an annular groove 63 that are formed in the case 41; and a movable-portion path 64 and a discharge portion 65 that are formed in the shaft 31.

The intake 61 communicates with the bearing holder path 62. The bearing holder path 62 communicates with the annular groove 63. The annular groove 63 extends around an inner circumferential surface of the case 41. The movable-portion path 64 communicates with the annular groove 63 and the bearing holder path 62 irrespective of an angular position of the shaft 31. The discharge portion 65 is opened on an outer circumferential surface of the shaft 31 near the shank 20.

Accordingly, when a refrigerant supply nozzle (not shown) of the spindle head 9 is arranged to be connected to the intake 61 while the friction stir welding tool 1 is attached to the spindle 8, the refrigerant supplied to the intake 61 flows through the bearing holder path 62, the annular groove 63 and the movable-portion path 64 and is discharged from the discharge portion 65.

The refrigerant flowing through the refrigerant path 60 cools heat conducted from the welding tool 10 to the rotary portion 30 to prevent the heat from being conducted to the bearing mechanism 50 and the bearing holder 40, eventually to the spindle 8 and the spindle head 9. Air (air cooling) is usable as the refrigerant. As long as the refrigerant is a fluid capable of transmitting heat, a coolant (water cooling) and the like may be used. When the coolant is used as the refrigerant, it is necessary to give extra consideration to a flow path of the coolant in order not to affect lubricity of the bearing.

In the exemplary embodiment, the shank 20 is connected to the spindle 8, thereby attaching the friction stir welding tool 1 to the machine tool. In association with the attachment, the bearing holder 40 is brought into contact with the end surface of the spindle head 9 by the contact members 42 and is positioned by the positioning member 43.

In this condition, the spindle head 9 and the friction stir welding tool 1 are moved to face the welding tool 10 toward the to-be-joined objects 7. When the spindle 8 is rotated, the shank 20, the rotary portion 30 and the welding tool 10 are integrally driven to be rotated. The welding tool 10 is pressed into the to-be-joined objects 7 and subsequently moved, thereby performing the friction stir welding.

At this time, a reaction force of the to-be-joined objects 7 causes a strong thrust force on the welding tool 10 and the rotary portion 30. This thrust force can be transmitted to the bearing holder 40 through the bearing mechanism 50 having the function of the thrust bearing, thereby being transmitted from the contact members 42 to the spindle head 9. Accordingly, the spindle 8 can be free from receiving the strong thrust force, so that a spindle bearing supporting the spindle 8 in the spindle head 9 can be kept safe.

In the exemplary embodiment, the thrust force of the welding tool 10 can be transmitted to the spindle head 9 through the contact members 42.

At this time, since the contact members 42 are circumferentially equidistant from each other, the thrust force applied to the spindle head 9 can be circumferentially balanced.

Further, since the contact members 42 are a plurality of divided members, a contact area of the contact members 42 with the spindle head 9 can be made smaller than a contact area of a contact member continuously extending along the entire circumference of the bearing holder 40. With this arrangement, a high heat of the welding tool 10 can be suppressed from being conducted to the spindle head 9.

In the exemplary embodiment, the heat conducted from the welding tool 10 to the rotary portion 30 can be cooled with the refrigerant flowing through the refrigerant path 60, so that the heat can be suppressed from being conducted from the bearing mechanism 50 to the bearing holder 40 and the spindle head 9.

It should be understood that the scope of the invention is not limited to the above-described exemplary embodiment but includes modifications and improvements as long as the modifications and improvements are compatible with an object of the invention.

As described above, the welding tool 10 and the shank 20 may be existing ones. The welding tool 10 and the shank 20 may be formed continuously from the shaft 31 or may be formed separately and connected to the shaft 31.

With respect to the bearing mechanism 50, as long as functioning as the bearing of the invention, the structure of the bearing mechanism 50 can be altered as needed.

A layout of the contact members 42 and a dimension of each of the contact members 42 only need to be designed as needed in the implementation of the invention. It is desirable to reduce the contact area of the contact members 42 with the spindle head 9 without adversely affecting the strength of the contact members 42. With respect to the layout of the contact members 42, the contact members 42 are desirably symmetric with respect to the center of the spindle 8 but not essential. An unbalanced layout of the contact members 42 is allowable as long as the load can be balanced.

In the refrigerant path 60, the bearing holder path 62 may be formed in a manner to extend over a wide area of the case 41 so that the bearing mechanism 50 can be cooled from the outside.

The refrigerant path 60 may be in a form of a path penetrating the center of the shank 20 and use a refrigerant supplied through the center of the spindle 8.

In the above exemplary embodiment, the welding tool 10 used for friction stir welding is used as the processing tool and attached to the tool holder 2 of the invention, thereby providing the friction stir welding tool 1. However, the processing tool attached to the tool holder 2 of the invention is not limited to the welding tool 10 used for friction stir welding, but may be a cutting tool provided by attaching other processing (e.g., cutting) tool to the tool holder 2 of the invention.

What is claimed is:

1. A tool holder of a machine tool, the machine tool comprising a spindle head and a spindle supported by the spindle head, the tool holder comprising:
    a shank portion attached to the spindle;
    a rotary portion integrally provided to the shank portion and to which a processing tool is attachable, the rotary portion including a refrigerant path therein;

a bearing supporting the rotary portion so that the rotary portion is rotatable; and a bearing holder holding the bearing, wherein the bearing holder is disposed facing the spindle head and comprises a plurality of arc-shaped contact members that are circumferentially disposed around the spindle on a surface facing the spindle head, the contact members being circumferentially equidistant from each other around the spindle, and each of the contact members being contactable with an end surface of the spindle head, a load applied to the bearing being transmitted to the spindle head via the contact members, and wherein an intake of the refrigerant path is provided in a part of the contact members and configured to accept refrigerant introduced from the spindle head to the refrigerant path.

2. The tool holder according to claim 1, wherein the processing tool is a friction stir welding tool, and the bearing comprises a thrust bearing.

3. A machine tool comprising:

the tool holder according to claim 1; and a positioning member between the spindle head and the bearing holder.

* * * * *